(12) United States Patent
Nam et al.

(10) Patent No.: US 9,016,411 B2
(45) Date of Patent: Apr. 28, 2015

(54) ENGINE ENCAPSULATION STRUCTURE OF VEHICLE

(75) Inventors: Jong Woo Nam, Seoul (KR); Won Sik Kim, Suwon-si (KR); Han Shin Chung, Yongin-si (KR); Min Soo Oh, Hwaseong-si (KR); Jae Yeon Kim, Hwaseong-si (KR); Jong Hoon Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 55 days.

(21) Appl. No.: 13/545,801

(22) Filed: Jul. 10, 2012

(65) Prior Publication Data
US 2013/0146376 A1 Jun. 13, 2013

(30) Foreign Application Priority Data

Dec. 7, 2011 (KR) .................. 10-2011-0130150

(51) Int. Cl.
*B60K 11/04* (2006.01)
*B60K 11/08* (2006.01)
*B60K 11/06* (2006.01)

(52) U.S. Cl.
CPC .............. *B60K 11/06* (2013.01); *B60K 11/085* (2013.01)

(58) Field of Classification Search
USPC ......... 180/68.1, 68.2, 68.3, 68.6, 69.22, 69.1; 123/41.04; 165/44
See application file for complete search history.

(56) References Cited

U.S. PATENT DOCUMENTS

| | | | | |
|---|---|---|---|---|
| 1,816,161 A | * | 7/1931 | Strauss | 123/41.64 |
| 2,138,001 A | * | 11/1938 | Fluor, Jr. | 180/68.1 |
| 3,815,702 A | * | 6/1974 | Paananen | 180/69.1 |
| 3,882,951 A | * | 5/1975 | Conley | 180/294 |
| 3,933,136 A | * | 1/1976 | Burst | 123/41.58 |
| 4,065,170 A | * | 12/1977 | Fabian et al. | 296/37.1 |
| 4,445,584 A | * | 5/1984 | Kimura et al. | 180/69.22 |
| 4,610,326 A | | 9/1986 | Kirchweger et al. | |
| 5,195,607 A | * | 3/1993 | Shimada et al. | 180/296 |
| 5,551,505 A | * | 9/1996 | Freeland | 165/41 |
| 6,854,544 B2 | * | 2/2005 | Vide | 180/68.6 |
| 2010/0200320 A1 | | 8/2010 | Lehmann et al. | |
| 2011/0137530 A1 | * | 6/2011 | Kerns | 701/49 |

FOREIGN PATENT DOCUMENTS

| | | |
|---|---|---|
| EP | 0233362 A1 | 8/1987 |
| EP | 0391391 A1 | 10/1990 |
| JP | 7-4831 U | 1/1995 |
| JP | 8-276867 A | 10/1996 |
| JP | 2007-170241 A | 7/2007 |

* cited by examiner

*Primary Examiner* — Frank Vanaman
(74) *Attorney, Agent, or Firm* — Morgan, Lewis & Bockius LLP

(57) ABSTRACT

An engine encapsulation structure of a vehicle may include an engine room encapsulation member disposed at an upper portion of an engine compartment and covering an upper portion of a power train having an engine and a transmission, an underbody encapsulation member disposed at a lower portion of the engine compartment and covering a lower portion of the power train, wherein the engine room encapsulation member and the underbody encapsulation member form an inner space and enclose the power train in the inner space when being assembled each other, and a front inlet formed at a front portion of the assembly to allow air through the front inlet and to cool the power train while the air passes through the inner space of the assembly, the air being discharged through a rear outlet formed to the assembly.

14 Claims, 9 Drawing Sheets

ENGINE ENCAPSULATION STRUCTURE OF VEHICLE

CROSS-REFERENCE TO RELATED APPLICATION

The present application claims priority to Korean Patent Application No. 10-2011-0130150 filed Dec. 7, 2011, the entire contents of which is incorporated herein for all purposes by this reference.

BACKGROUND

1. Field of the Invention

The present invention relates to an engine encapsulation structure of a vehicle. More particularly, it relates to a multipurpose engine encapsulation structure of a vehicle that can simultaneously improve relating performance, such as fuel efficiency, acoustics, and aerodynamics, by optimizing heat flow in an engine room for improving cooling performance and by optimizing heat management in the engine room.

2. Description of Related Art

A vehicle is structurally divided into a car body and a chassis. The car body is a part that forms the outer shape of the vehicle, including an engine room, and generally, an engine, a transmission, a cooling system, and various auxiliary components are disposed in the engine room.

Since the engine room is a space where the engine that generates high-temperature heat while operating, it should be necessarily considered to optimize heat flow for the layout of the engine room in the process of developing a vehicle in order to effectively cool the engine and prevent thermal damage to the engine.

Therefore, automobile manufacturers have been made an effort to improve cooling performance by conducting various researches, such as analysis of influence of heat flow factors on the layout in an engine room.

That is, heat flow has been optimized by improving factors that influence the heat flow in and engine room, that is, increasing the span distance of left and right side members and the left-right distance of a strut housing, simplifying and optimally disposing the configuration of auxiliary components and the parts in the engine room, tilting a cooling fan, and optimizing the air guide structure, and a predetermined level of improvement effect, such as cooling and preventing of thermal damage, has been achieved However, although it is possible to improve partial performance, such as cooling an engine and preventing thermal damage, but it is difficult to achieve sufficient effect in terms of overall engineering performance of the engine room and in the synthetic side, such as fuel efficient or emission, acoustics, and aerodynamics, only by optimizing the heat flow for the layout of the engine room.

Further, a desired effect for improving cooling performance and efficient by optimizing the structure and arrangement of a cooling module (for example, tilting a cooling fan), applying an active air flap, and optimizing the arrangement and structure of an air guide in the related art, but in practice, the improvement effect and range are limited in the synthetic terms of the engine room and there is a limit to distributing heat flow to the right positions due to complicated flow characteristics in the engine room.

Further, although the engine rooms are equipped with an engine cover that covers the upper portion of an engine and an under-cover that disposed at the lower portion of the engine room in common vehicles in order to reduce noise, the structure has been improved and optimized and the material has been improved for the parts in order to reduce noise and discharge heat, but fuel efficiency or aerodynamics has not been appropriately considered.

Therefore, an optimum structure for thermal management of an engine room which is further improved for optimizing heat flow in the engine room in terms of cooling is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multipurpose engine encapsulation structure of a vehicle that can simultaneously improve relating performance, such as fuel efficiency, acoustics, and aerodynamics, by optimizing heat flow in an engine room for improving cooling performance and by optimizing heat management in the engine room.

In an aspect of the present invention, an engine encapsulation structure of a vehicle may include an engine room encapsulation member disposed at an upper portion of an engine compartment and covering an upper portion of a power train having an engine and a transmission, an underbody encapsulation member disposed at a lower portion of the engine compartment and covering a lower portion of the power train, wherein the engine room encapsulation member and the underbody encapsulation member form an inner space and enclose the power train in the inner space when being assembled each other, and a front inlet formed at a front portion of the assembly to allow air through the front inlet and to cool the power train while the air passes through the inner space of the assembly, the air being discharged through a rear outlet formed to the assembly.

The engine room encapsulation member covers a space between a front end module, a dash panel, and left and right side members of a car body, at the upper portion of the engine compartment.

The engine room encapsulation member may have a top cover covering an upper portion of the inner space, left and right side covers covering lateral sides of the inner space, and a rear cover formed at rear ends of the top cover and the left and right side covers to cover a rear side of the inner space, and wherein a front of the engine room encapsulation member is open to introduce the air.

An insulator for blocking heat and absorbing sound is mounted on an inner side of the engine room encapsulation member.

An insulator for blocking heat and absorbing sound is mounted on an inner side of the engine room encapsulation member and an anti-thermal damage plate is mounted around parts of an exhaust system, in the inside of the engine room encapsulation member or the inside of the insulator.

The underbody encapsulation member may have an underside cover that covers a lower portion of the inner space, and left and right side covers that covers lateral sides of the inner space, wherein front and rear portions of the underbody encapsulation member are open to introduce and discharge the air.

An anti-thermal damage plate is mounted around parts of an exhaust system, on an inner side of the underbody encapsulation member.

An insulator for blocking heat is disposed under the engine and oil pans of the transmission, on an inner side of the underbody encapsulation member.

Nozzle throat forming portions protruding inward the inner space are formed at a front portion of the top cover for covering an upper portion of the inner space and at a front portion of the underside cover for covering a lower portion of the inner space, wherein the nozzle throat forming portions accelerate the air by reducing a flow cross-sectional area of the air in passing over the nozzle throat forming portions.

A nozzle throat forming portion that accelerates air by reducing a flow cross-sectional area of the air discharged through the rear outlet is additionally formed at a rear portion of an underside cover of the underbody encapsulation member.

An exhaust system cooling air guide that guides the air introduced through the front inlet to the rear outlet, is formed on inner sides of left and right side covers covering lateral sides of the inner space.

The exhaust system cooling air guide is arranged along an arrangement path including an exhaust pipe, and guides the air introduced through the front inlet to the arrangement path.

The exhaust system cooling air guide is arranged slanted with respect to a longitudinal axis of the vehicle and the arrangement path is arranged along a slope of the exhaust system cooling air guide.

The exhaust system cooling air guide is arranged slanted with respect to a longitudinal axis of the vehicle.

An air flap that opens or closes the front inlet of the assembly, wherein opening and closing of the air flap is controlled by a control signal outputted from a control unit in accordance with a driving state of the vehicle to perform cooling and heat keeping of the inner space where the power train is disposed.

Therefore, according to the engine encapsulation structure of a vehicle, the structure covers the engine and the transmission and has a performance of blocking heat, such that it is possible to rapidly warm up the engine and the transmission at the next early stage of driving by keeping the heat in the engine room, and to contribute to improving fuel efficiency by reducing mechanical friction force.

In particular, the engine encapsulation structure of the present invention makes it possible to reduce exhaust gases, such as $CO_2$, improve initial fuel efficiency, improve initial heating performance, and reduce wear of the engine and the transmission by reducing the warming-up time, and to have a sound-absorbing performance with reduction of cold idle noise, such that it provides an advantage of reducing noise (engine noise and road noise while driving) transmitted into the interior through a dash panel and reducing damage to pedestrians because the structure functions as a shock-absorbing structure when hitting a pedestrian.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
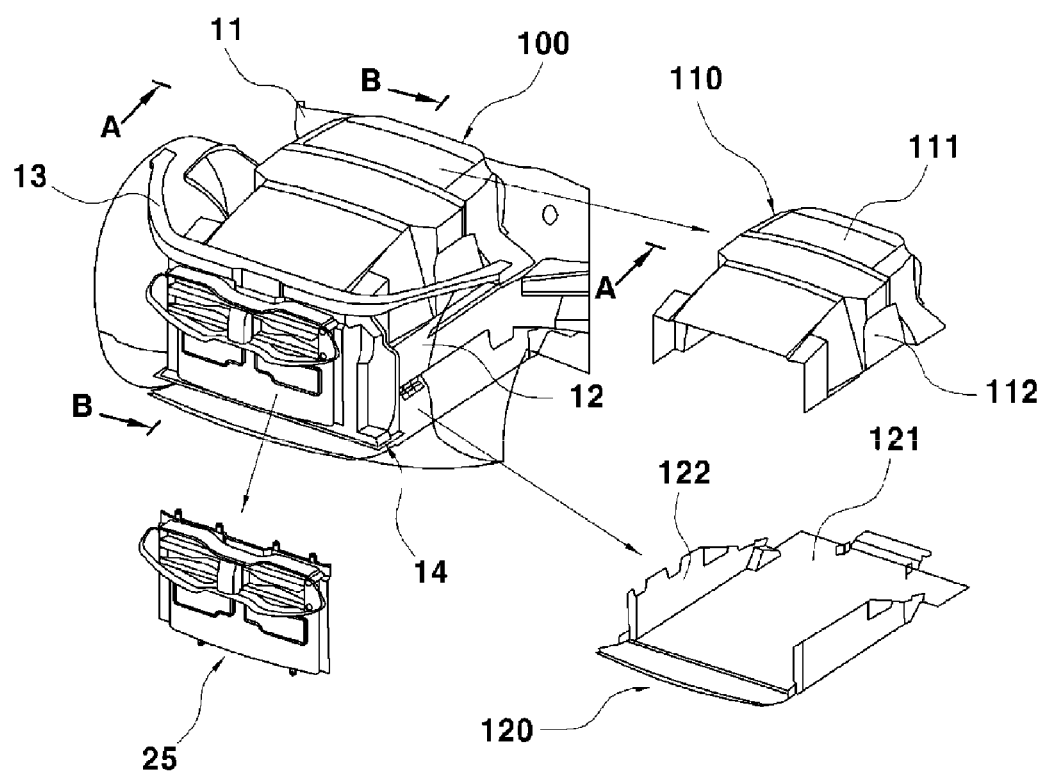
FIG. 1 is a perspective view showing the configuration and arrangement of an engine encapsulation structure according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention provides a multipurpose engine encapsulation structure of a vehicle that can simultaneously improve relating performances, such as fuel efficiency, emissions, and aerodynamics, in order to optimize thermal management in an engine room while optimizing heat flow in the engine room to improve cooling performance.

An engine encapsulation structure of the present invention is, as described below, formed to cover an engine and an part of an exhaust system, such as an exhaust pipe, and a transmission, which operate with the engine, and to have a heat-blocking performance, such that the engine encapsulation structure makes it possible to rapidly warm up the engine (including the part of the exhaust system) and a power train including the transmission at the next early stage of driving by keeping the heat in the engine room, and to contribute to improving fuel efficiency by reducing mechanical friction force.

In particular, the engine encapsulation structure of the present invention makes it possible to reduce exhaust gases, such as CO2, improve initial fuel efficiency, improve initial heating performance, and reduce wear of the engine and the transmission by reducing the warming-up time, and to have a sound-absorbing performance with reduction of cold idle noise, such that it provides an advantage of reducing noise (engine noise and road noise while traveling) transmitted into the interior through a dash panel and reducing damage to pedestrians because the structure functions as a shock-absorbing structure when hitting a pedestrian.

The configuration and arrangement of an engine encapsulation structure of the present invention are described in detail with reference to the drawings.

Figure 2:
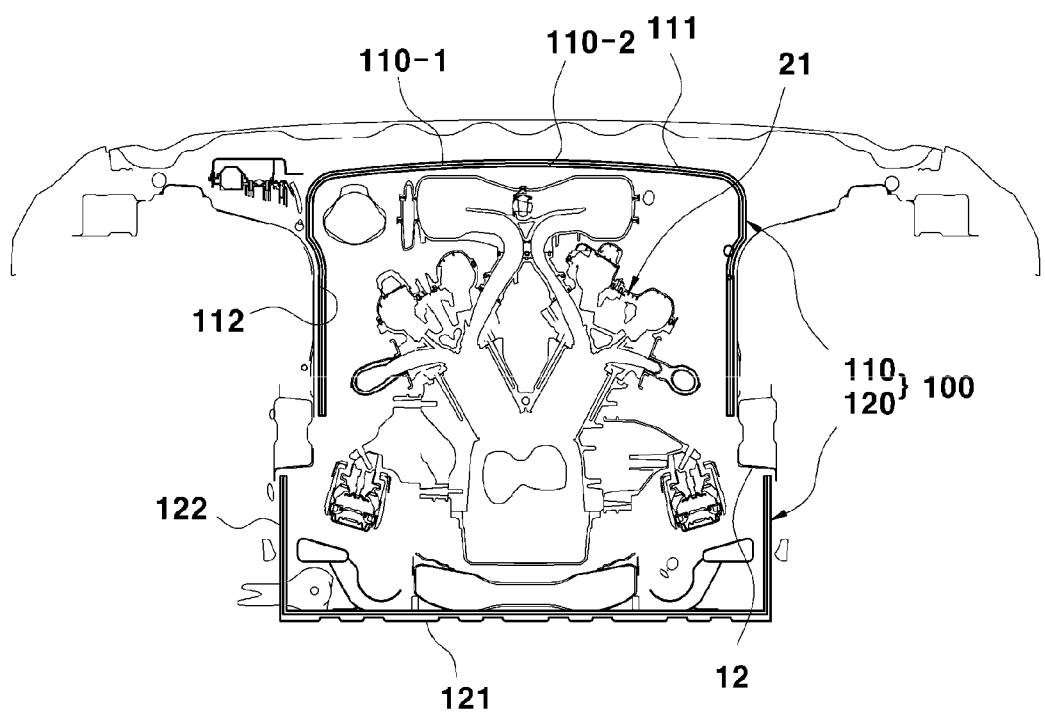
FIGS. 2 and 3 are cross-sectional views showing an example of arranging the engine encapsulation structure according to an exemplary embodiment of the present invention.
Figure 3:
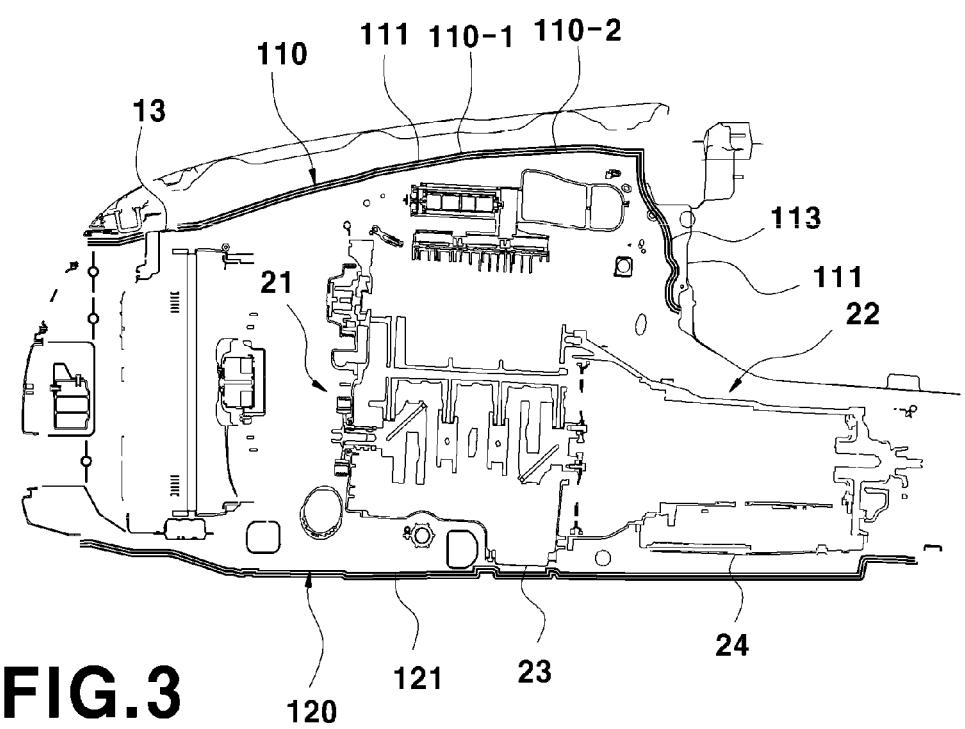

FIG. 1 is a perspective view showing the configuration and arrangement of an engine encapsulation structure 100 according to an exemplary embodiment of the present invention, and FIGS. 2 and 3 are cross-sectional views showing an example of arranging the engine encapsulation structure according to an exemplary embodiment of the present invention, in which FIG. 2 is a cross-sectional view taken along line A-A of FIG. 1 and FIG. 3 is a cross-sectional view taken along line B-B of FIG. 1.

Figure 4:
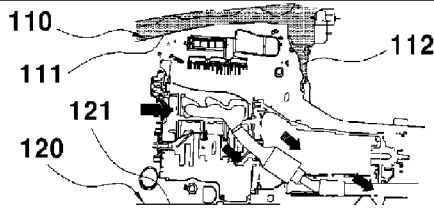
FIG. 4 is a view schematically showing the airflow when the engine encapsulation structure according to an exemplary embodiment of the present invention is applied.
Figure 5:
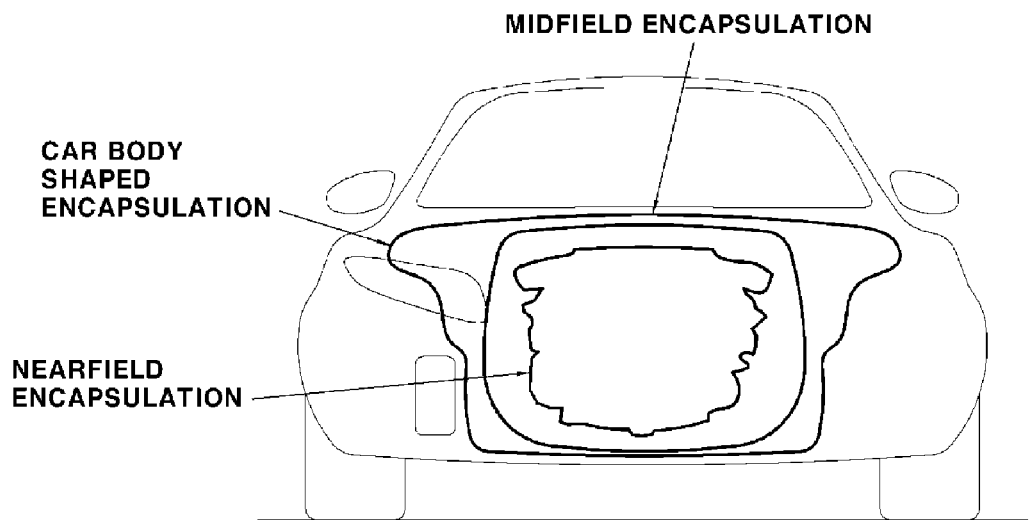
FIG. 5 is a reference view illustrating an engine encapsulation principle of the present invention.

FIG. 4 is a view schematically showing the airflow when the engine encapsulation structure 100 according to an exemplary embodiment of the present invention is applied and FIG. 5 is a reference view illustrating an engine encapsulation principle of the present invention.

The conception of an engine encapsulation of the present invention is described first. The conception of Nearfield encapsulation, a midfield encapsulation, and a car body shaped encapsulation, as shown in FIG. 5, is referred in order to provide definite description of the present invention.

The nearfield encapsulation is a conception that encapsulates an engine and a transmission by directly attaching an encapsulation member to the surfaces of the engine and the transmission in order to usually encapsulate only the engine and the transmission, but it has a difficult in implement the layout due to various structures and arrangements of the engine, the transmission, and the accessories.

The car body shaped encapsulation is conception that encapsulates the entire of an engine room by attaching a member to the surface of a car body in accordance with the car body shape in the engine room, but it has a problem in that the layout is easily implemented in practice, but the cost and weight excessively increase.

Therefore, the engine encapsulation structure 100 of the present invention is implemented by the midfield encapsulation conception, which is conception that is spatially enlarged in comparison to the nearfield encapsulation, but narrower conception than the car body encapsulation.

That is, the midfield encapsulation is conception that performs encapsulation on the power train composed of the engine (including the accessories of the exhaust system) and the transmission and the middle portion of the car body, such that it may be called hybrid encapsulation concept for optimizing the performance, layout, cost, and weight.

The engine encapsulation structure 100 of the present invention is described with reference to FIG. 1. As shown in the figure, the engine encapsulation structure 100 disposed at the upper portion of an engine room includes an engine room encapsulation member 110 and an underbody encapsulation member 120 disposed at the lower portion of the engine room.

The engine room encapsulation member 110, an upper covering structure fixed at the upper portion in the engine room, is disposed to cover the space among a front end module 14 at the front end of the car body, a dash panel 11 disposed at the interface of the engine room and the interior of the vehicle, and left and right side member 12, including the upper space, such as an engine (21 in FIG. 3) and a transmission (22 in FIG. 3), at the upper portion in the engine room.

The engine room encapsulation member 110 includes a top cover 111 covering the upper portion of the engine room and left and right side covers 112 covering the sides, which are integrally formed, and has an n-shaped cross-section taken along the transverse direction of the car body, as shown in FIG. 2.

A rear cover 113 covering the rear side is integrally formed at the rear ends of the top cover 111 and the side covers 112 and the front side is open to introduce air.

The engine room encapsulation member 110 can be fixed to the car body in the engine room or a fixture attached to the car body, and for example, the front end of the top cover 11 may be fixed to a carrier 13 of a front end module 14 at a position corresponding to the front, the left and right side covers 112 may be fixed to the car body in the engine room and side members, and the rear cover 113 may be fixed to a dash panel 11.

The engine room encapsulation member 110, which is fixed as described above, may be manufactured by forming synthetic resin to have a predetermined thickness in order to reduce the weight, and preferably, may be made of a complex material made by reinforcing synthetic resin a reinforcing material, such as glass fiber, for example, PP-GF30 (polypropylene glass fiber).

Further, in a preferable embodiment, an insulator 110-1 for keeping warmth (blocking heat) and absorbing sound which has a predetermined thickness may be mounted on the inner side of the engine room encapsulation member 110, in which the insulator 110-1 may be made of polyurethane foam, but the present invention is not limited thereto, and other materials known as materials for blocking heat and absorbing sound may be selected and used.

Further, an anti-thermal damage plate 110-2 may be additionally mounted on the inner side of the engine room encapsulation member 110 or around the parts of the exhaust system on the inner side of the insulator 110-1, in which the anti-thermal damage plate 110-2 may be a thin plate made of an aluminum alloy to have a predetermined thickness.

On the other hand, the underbody encapsulation member 120 is a member that complements and replace existing engine room underbodies, in which, unlike common underbodies that are mounted in a flat plate structure, an underside cover 121 covering the lower portion of the engine room and left and right side covers 122 covering the sides are integrally formed to have a U-shaped cross-sectional shape, as shown in FIG. 2.

The underbody encapsulation member 120, a lower blocking structure fixed at the lower portion in the engine room, is disposed to cover the structure between the front end rear ends of the car body and the left and right side member 12, including the lower space for the engine 21 and the transmission 22, at the lower portion in the engine room.

The underbody encapsulation member 120 may also be fixed to the car body in the engine room or a fixture attached to the car body, in which, for example, the left and right side covers 122 may be fixed to the side car body and the side members 12 in the engine room.

The underbody encapsulation member 120, which is fixed as described above, may also be manufactured by forming synthetic resin to have a predetermined thickness in order to reduce the weight, and preferably, may be made of a complex material made by reinforcing synthetic resin a reinforcing material, such as glass fiber, for example, PP-GF30.

Further, an anti-thermal damage plate 110-2 may be additionally mounted around the parts of the exhaust system on the inner side of the underbody encapsulation member 120, in which the anti-thermal damage plate may be a thin plate made of an aluminum alloy to have a predetermined thickness.

Further, an insulator 110-1 for keeping warmth (blocking heat) which has a predetermined thickness may be mounted under the engine 21 and oil pans 23 and 24 of the transmission 22, on the inner side of the underbody encapsulation member 120, in which the insulator 110-1 may be made of polyurethane foam, but the present invention is not limited thereto, and other materials known as materials for blocking heat may be selected and used.

As described above, the engine encapsulation structure 100 of the present invention is disposed in the engine room, as shown in FIGS. 1 and 3, reference numeral '25' in FIG. 1 indicates a cooling duct disposed at the front end of the car body and an active air flap that opens/closes the front inlet of the engine encapsulation structure 100 in response to a control signal of a control unit is disposed in the cooling duct 25.

The active air flap is a device that opens/closes the front inlet of the engine encapsulation structure 100 and controls air flowing into/out of the engine encapsulation structure 100 while opening/closing.

The active air flap is controlled to open/close in response to a control signal outputted from the control unit in accordance with the driving state of a vehicle, such that it is controlled to close by the control unit in initial start or a Key-Off state, and to open in cooing while the vehicle travels.

In detail, the control unit controls the air flap to open for cooling under a temperature condition where the temperatures of cooling water, exhaust gases, engine oil, and transmission oil is a reference or more while the vehicle travels, and controls the air flap to close under a temperature condition that is a reference or lower, such as initial start of the vehicle (for rapid warm-up), low-load traveling, constant-speed traveling, and Key-OFF (for heat preserving heat).

The air flap has been mounted in the vehicle and may be an air flap disposed to open/close a radiator grill or a bumper hole, or may be a fan louver active air flap that is disposed to open/close a draft hole of a cooling fan shroud in the cooling module.

The airflow is described hereafter with reference to FIG. 4. Air is introduced through the front inlet of the engine encapsulation structure 100, with the air flap open, the air flowing inside cools the parts of the power train including the engine (including the exhaust pipe and the parts of the exhaust system) and the transmission 22 through the engine encapsulation structure 100, and is then discharged to the rear side through the open rear side of the underbody encapsulation member 120.

Further, when the air flap closes when the vehicle is in the Key-Off state, stopped, initially started, or driven at low-load high speed or low speed, the front inlet of the engine encapsulation structure 100 is closed and the engine encapsulation structure 100 has covered the periphery of the engine 21, such that the heat in the engine room is kept.

In particular, it is possible to rapidly warm up the engine 21 and the transmission at the early state of the next driving while keeping the heat in the engine room, with the air flap closed in Key-Off or initial start, which reduces mechanical friction force and contributes to improving fuel efficiency.

Further, since the engine encapsulation structure 100 covering the engine 21 and the transmission 22 is sealed, when the air flap is closed in the initial start, the engine and the transmission can be warmed up by the engine encapsulation structure 100 of the present invention, faster than the related art, such that it is possible to reduce exhaust gases CO2, improve initial heating performance, and reduce wear of the engine and the transmission, by reducing the warm-up time.

Further, as the flap opens when the vehicle travels at high-load low speed of high speed, the air flowing to the front portion can cool the surfaces of the engine and the parts of the exhaust system through the engine encapsulation structure 100.

Further, as the engine and the transmission are rapidly warmed up, it is possible to reduce cold idle noise and the noise (engine noise and road noise while traveling) transmitted to the interior through the dash panel 11 and the structure functions as a shock-absorbing structure when the vehicle hits a pedestrian, such that it is possible to provide an effect of reducing an injury to the pedestrian.

Therefore, it is possible to simultaneously improve the relating performances, such as the fuel efficiency, emissions, aerodynamics, when using the engine encapsulation structure of the present invention.

Figure 6:
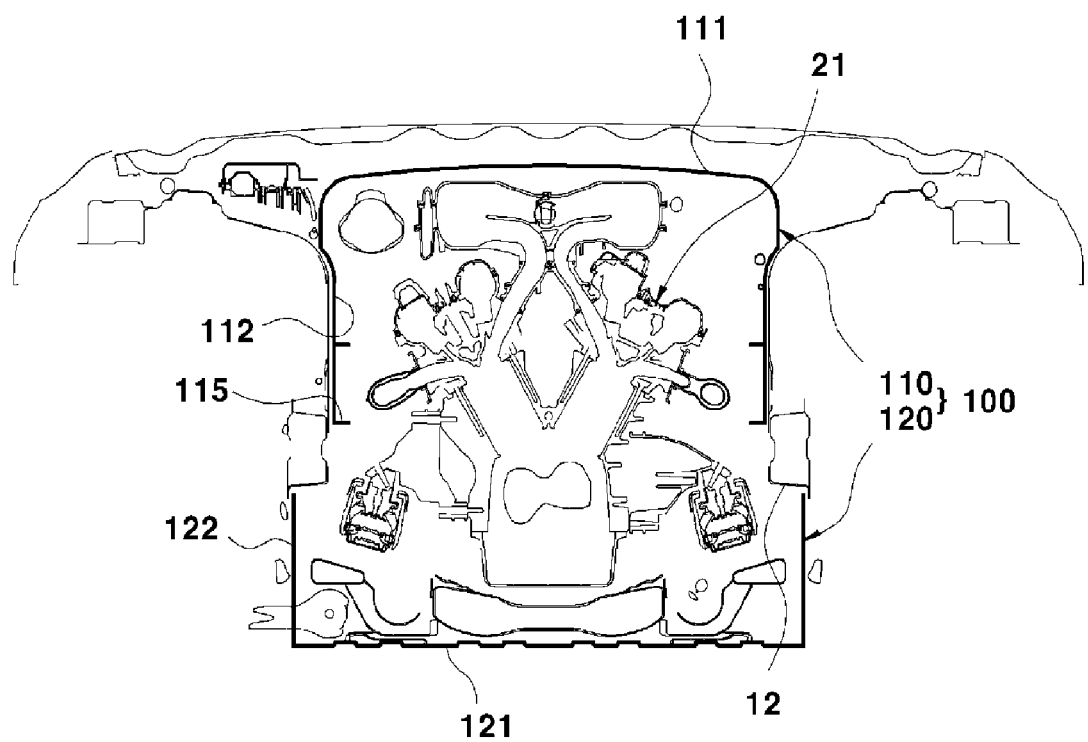
FIGS. 6 and 7 are cross-sectional views when an engine encapsulation structure according to another embodiment of the present invention is applied, in which nozzle throat forming portions for accelerating air at the inlet and the outlet and a cooling air guide are formed.
Figure 7:
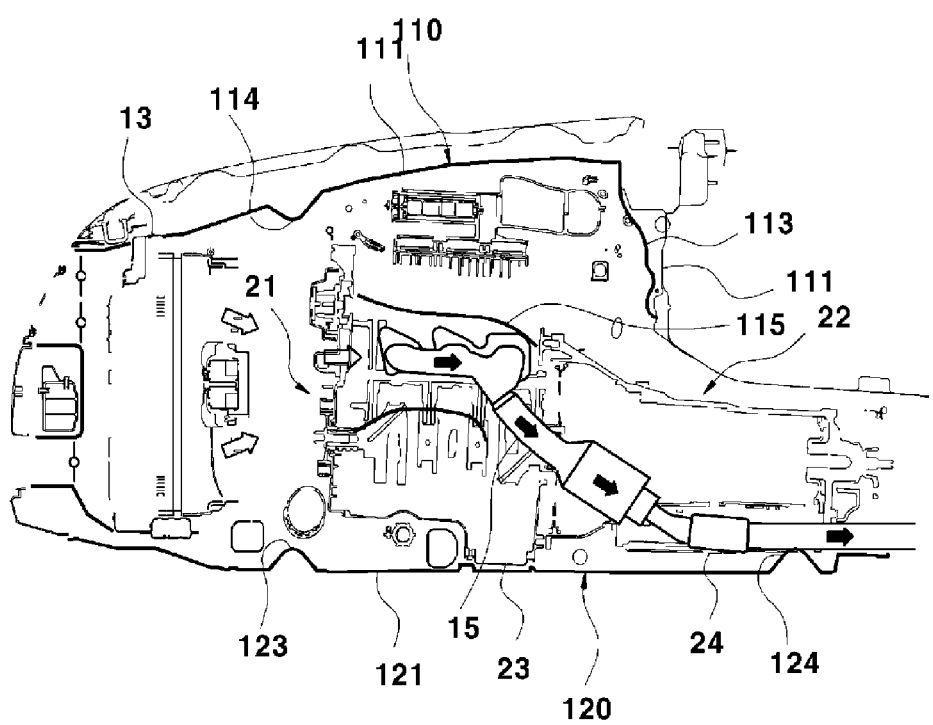

On the other hand, FIGS. 6 and 7 are cross-sectional views when an engine encapsulation structure according to another embodiment of the present invention is applied, in which nozzle throat forming portions 114, 123, and 124 for accelerating air at the inlet and the outlet and a cooling air guide 115 are formed.

In the exemplary embodiment shown in FIGS. 6 and 7, the nozzle throat forming portions 114, 123, and 124 for accelerating air are disposed at the front portion through which air is introduced and the rear portion through which the air is discharged, in the engine encapsulation structure 100, as shown in the figures, in which the nozzle throat forming portions 114, 123, and 124 are formed to protrude inward from the inner side of the top cover 111 of the engine room encapsulation member 110 and the inner side of the underside cover 121 of the underbody encapsulation member 120 in the engine encapsulation structure 100.

In this configuration, the nozzle throat forming portions 114 and 124 may be disposed to protrude at the upper and lower positions on the inner side of the top cover 111 and the inner side of the underside cover 121, at the front portion of the engine encapsulation structure 100 such that the flow cross-sectional area of the front portion of the engine encapsulation structure through which air is introduced can be reduced by the nozzle throat forming portions 114 and 123 in the front-rear flow path of the air.

Further, the nozzle throat forming portion 124 having a convex shape may be additionally formed on the inner side of the rear end of the underside cover 121 of the underbody encapsulation member 120 to reduce the flow cross-sectional area of the discharged air such that the air, which is discharged to the rear side through the open rear surface of the underbody encapsulation member after passing through the engine encapsulation structure 100, can be accelerated.

The nozzle throat forming portion 124 at the rear end of the underside cover 121 is provided to increase the discharge speed of the air cooling the engine and the transmission by accelerating the discharged air, such that the nozzle throat forming portions 114 and 123 formed at the front portion of the engine encapsulation structure 100 and the nozzle throat forming portion 124 formed at the rear portion accelerate the introduced air and the discharged air at the inlet and the outlet of the engine encapsulation structure 100, thereby increasing the cooling effect.

Accordingly, the air introduced through the front inlet of the engine encapsulation structure 100 is accelerated while sequentially passing through the portions of which the flow cross-sectional areas are reduced by the nozzle throat forming portions 114, 123, and 124, such that the accelerated air passes faster through the engine encapsulation structure 100, thereby achieving more effective cooling.

Further, in the exemplary embodiments shown in FIGS. 5 and 6, an exhaust system cooling air guide 115, which guides the air to flow to the rear side along the arrangement path of a part 15 of the exhaust system such that the air introduced in the engine encapsulation structure 100 can flow along the part 15 (exhaust pipe) of the exhaust system, is disposed on the inner sides of the left and right side covers 112 of the engine room encapsulation member 110.

The exhaust system cooling air guide 115 is formed at the upper and lower positions on the inner side of the left and right side covers 112 to be long to the front and rear in the car body direction, such that the air introduced into the engine encapsulation structure 100 can be concentrated along the path where the exhaust system is arranged, by the guide 115.

As described above, since the guide 115 that guides the air to concentrate along the arrangement path of the part 15 of the exhaust system that is maintained at a high temperature while the vehicle travels, the part 15 of the exhaust system can be more effectively cooled and the exhaust system cooling air guide 115 becomes a main component that makes it possible to achieve optimum heat management and improvement of cooling performance of the engine room, together with the nozzle throat forming portions 114, 123, and 124.

Even in the engine encapsulation structure 100 of the exemplary embodiment described above, when an active air flap that opens/closes the front inlet is disposed, it is possible to control air flowing into/out of the engine encapsulation structure 100.

That is, the control unit controls the air flap to open for cooling under a temperature condition where the temperatures of cooling water, exhaust gases, engine oil, and transmission oil is a reference or more while the vehicle travels, and controls the air flap to close under a temperature condition that is a reference or lower, such as initial start of the vehicle (rapid warm-up), low-load traveling, constant-speed traveling, and Key-OFF (for heat preserving heat).

Figure 8:
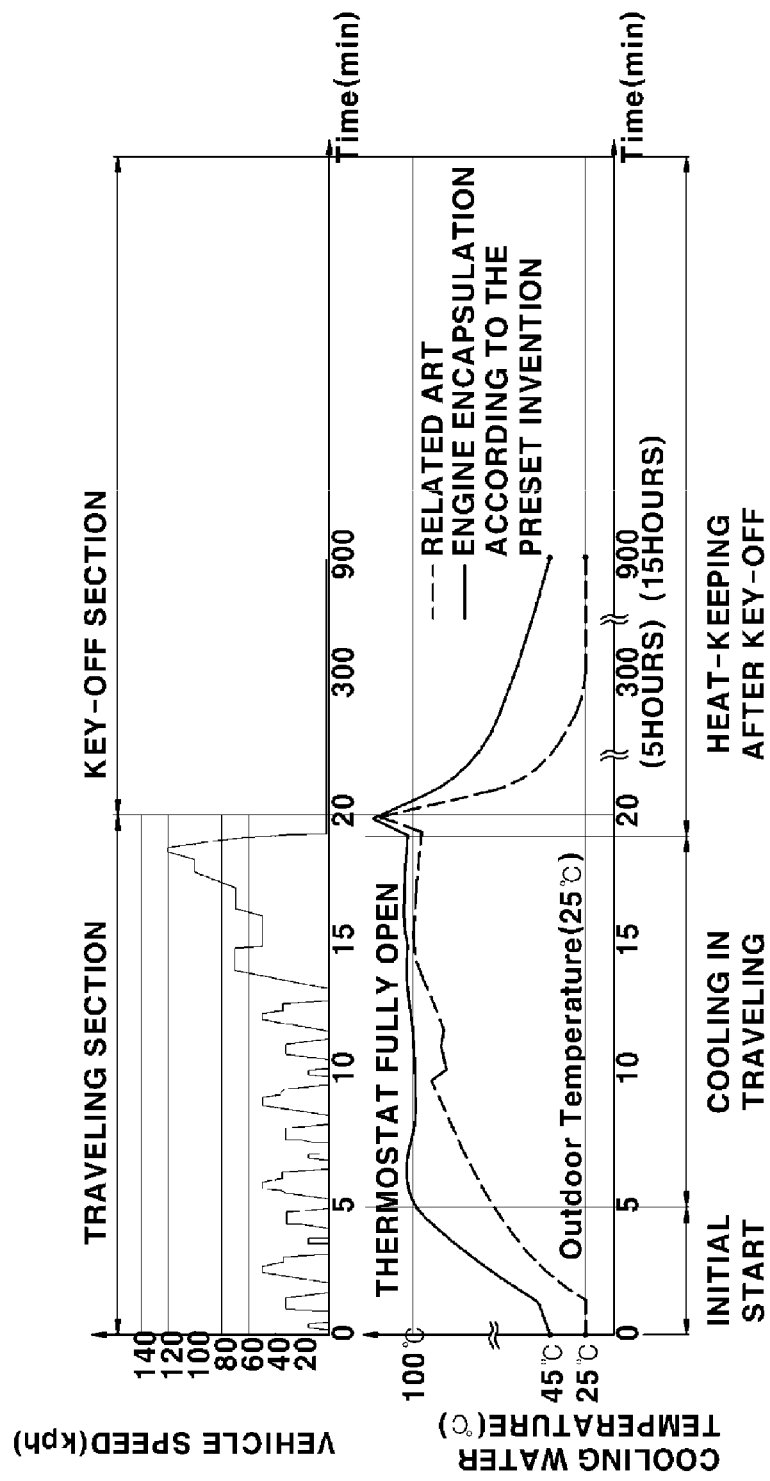
FIG. 8 is a view showing initial starting, cooling in traveling, and cooling water temperature in a key-off state, when the engine encapsulation structure of the exemplary embodiment shown in FIGS. 6 and 7 is applied.

FIG. 8 is a view showing initial starting, cooling in traveling, and cooling water temperature in a key-off state, when the engine encapsulation structure of the exemplary embodiment shown in FIGS. 6 and 7 is applied.

Figure 9:
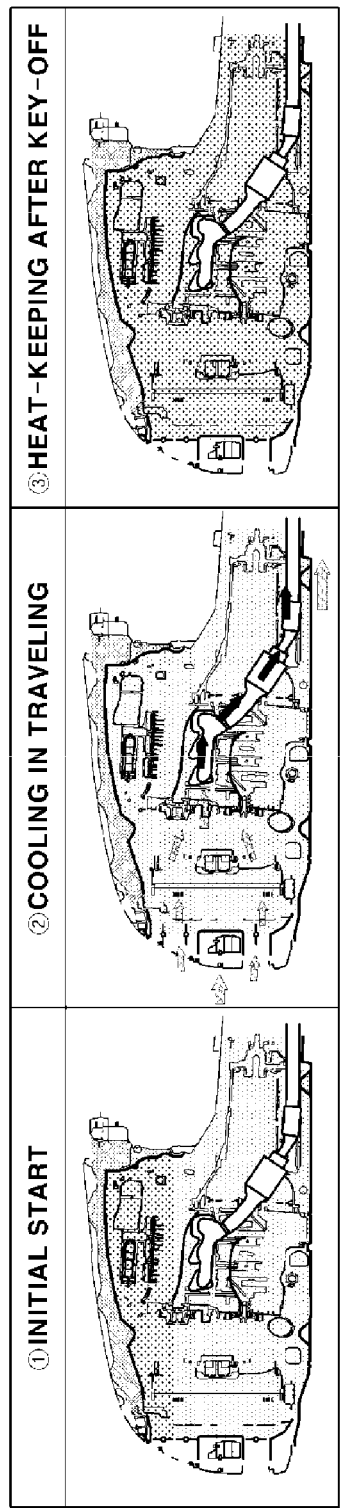
FIG. 9 is a view showing initial starting, cooling in traveling, and thermal management of an engine room in a key-off state, when the engine encapsulation structure of the exemplary embodiment shown in FIGS. 6 and 7 is applied.

FIG. 9 is a view showing initial starting, cooling in traveling, and thermal management of an engine room in a key-off state, when the engine encapsulation structure of the exemplary embodiment shown in FIGS. 6 and 7 is applied.

First, the engine can be more rapidly warmed up by the heat-keeping operation (see FIG. 9) of the engine encapsulation structure covering the engine and the transmission, with the air flap closed in the initial start, in which the temperature of engine cooling water can be more rapidly increased in the initial start, as shown in FIG. 8, by the rapid warm-up of the engine and the timing when the thermostat is fully opened can be made earlier.

Referring to FIG. 8, it can be seen that the timing when the engine finishes being warmed up (thermostat fully opens) is considerably shortened to 5 minutes from 15 minutes in the related art.

Further, with the air flap open in cooling while the vehicle travels, as shown in FIG. 9, the air introduced into the engine encapsulation structure is guided to flow along the path of the parts of the exhaust system and the surfaces of the parts of the exhaust system is effectively cooled, and after the Key-Off state, heat is kept for a long time with the air flap closed after the engine stops, such that the internal temperature of the engine room can be kept higher than the temperature of the external air.

Referring to FIG. 8, it can be seen that the temperature can be maintained at 45 by the heat-keeping operation of the engine encapsulation structure even though 15 hours passed after the engine stops under the condition that the temperature of the external air is 25.

On the other hand, it can be seen in the related art that the internal temperature of the engine encapsulation structure reaches the temperature of the external air after about 5 hours passed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine encapsulation structure of a vehicle comprising:
    an engine room encapsulation member disposed at an upper portion of an engine compartment and covering an upper portion of a power train having an engine and a transmission;
    an underbody encapsulation member disposed at a lower portion of the engine compartment and covering a lower portion of the power train, wherein the engine room encapsulation member and the underbody encapsulation member form an inner space and enclose the power train in the inner space when the engine room encapsulation member and the underbody encapsulation member are assembled with each other; and
    a front inlet formed at a front portion of the assembly to allow air through the front inlet and to cool the power train while the air passes through the inner space of the assembly, the air being discharged through a rear outlet formed to the assembly,
    wherein the engine room encapsulation member has:
        a top cover covering an upper portion of the inner space;
        left and right side covers covering lateral sides of the inner space; and a rear cover formed at rear ends of the top cover and the left and right side covers to cover a rear side of the inner space, wherein a lower end of the rear cover is disposed above the transmission to form the rear outlet between the lower end of the rear cover and the transmission and a flow passage between an inside of the engine room encapsulation member and an outside thereof through the rear outlet, wherein a front of the engine room encapsulation member is open to introduce the air, and wherein an exhaust system cooling air guide that guides the air introduced through the front inlet to the rear outlet, is formed on inner sides of left and right side covers covering lateral sides of the inner space.

2. The structure according to claim 1, wherein the engine room encapsulation member covers a space between a front end module, a dash panel, and left and right side members of a car body, at the upper portion of the engine compartment.

3. The structure according to claim 1, wherein an insulator for blocking heat and absorbing sound is mounted on an inner side of the engine room encapsulation member.

4. The structure according to claim 1, wherein an insulator for blocking heat and absorbing sound is mounted on an inner side of the engine room encapsulation member and an anti-thermal damage plate is mounted around parts of an exhaust system, in the inside of the engine room encapsulation member or the inside of the insulator.

5. The structure according to claim 1, wherein the underbody encapsulation member has:
an underside cover that covers a lower portion of the inner space; and
the left and right side covers that cover the lateral sides of the inner space,
wherein front and rear portions of the underbody encapsulation member are open to introduce and discharge the air.

6. The structure according to claim 1, wherein an anti-thermal damage plate is mounted around parts of an exhaust system, on an inner side of the underbody encapsulation member.

7. The structure according to claim 1, wherein an insulator for blocking heat is disposed under the engine and oil pans of the transmission, on an inner side of the underbody encapsulation member.

8. The structure according to claim 1,
wherein nozzle throat forming portions protruding inward from the inner space are formed at a front portion of the top cover for covering an upper portion of the inner space and at a front portion of an underside cover for covering a lower portion of the inner space, and
wherein the nozzle throat forming portions accelerate the air by reducing a flow cross-sectional area of the air in passing over the nozzle throat forming portions.

9. The structure according to claim 8, wherein a nozzle throat forming portion that accelerates air by reducing a flow cross-sectional area of the air discharged through the rear outlet is additionally formed at a rear portion of an underside cover of the underbody encapsulation member.

10. The structure according to claim 1, wherein the exhaust system cooling air guide is arranged along an arrangement path including an exhaust pipe, and guides the air introduced through the front inlet to the arrangement path.

11. The structure according to claim 10, wherein the exhaust system cooling air guide is arranged slanted with respect to a longitudinal axis of the vehicle and the arrangement path is arranged along a slope of the exhaust system cooling air guide.

12. The structure according to claim 1, wherein the exhaust system cooling air guide is arranged slanted with respect to a longitudinal axis of the vehicle.

13. The structure according to claim 1,
wherein an air flap opens or closes the front inlet of the assembly, and
wherein opening and closing of the air flap is controlled by a control signal outputted from a control unit in accordance with a driving state of the vehicle to perform cooling and heat keeping of the inner space where the power train is disposed.

14. An engine encapsulation structure of a vehicle comprising:
an engine room encapsulation member disposed at an upper portion of an engine compartment and covering an upper portion of a power train having an engine and a transmission;
an underbody encapsulation member disposed at a lower portion of the engine compartment and covering a lower portion of the power train, wherein the engine room encapsulation member and the underbody encapsulation member form an inner space and enclose the power train in the inner space when the engine room encapsulation member and the underbody encapsulation member are assembled with each other; and
a front inlet formed at a front portion of the assembly to allow air through the front inlet and to cool the power train while the air passes through the inner space of the assembly, the air being discharged through a rear outlet formed to the assembly,
wherein the engine room encapsulation member has:
a top cover covering an upper portion of the inner space;
left and right side covers covering lateral sides of the inner space; and
a rear cover formed at rear ends of the top cover and the left and right side covers to cover a rear side of the inner space,
wherein a lower end of the rear cover is disposed above the transmission to form the rear outlet between the lower end of the rear cover and the transmission and a flow passage between an inside of the engine room encapsulation member and an outside thereof through the rear outlet,
wherein a front of the engine room encapsulation member is open to introduce the air,
wherein nozzle throat forming portions protruding inward from the inner space are formed at a front portion of the top cover for covering an upper portion of the inner space and at a front portion of an underside cover for covering a lower portion of the inner space,
wherein the nozzle throat forming portions accelerate the air by reducing a flow cross-sectional area of the air in passing over the nozzle throat forming portions, and
wherein a nozzle throat forming portion that accelerates air by reducing a flow cross-sectional area of the air discharged through the rear outlet is additionally formed at a rear portion of an underside cover of the underbody encapsulation member.

* * * * *